(12) United States Patent
Zhou et al.

(10) Patent No.: US 7,557,064 B2
(45) Date of Patent: Jul. 7, 2009

(54) METHODS FOR MAKING IMMOBILIZED ARYL-CONTAINING LIGANDS

(75) Inventors: Bing Zhou, Cranbury, NJ (US);
Changkun Liu, Lawrenceville, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 0 days.

(21) Appl. No.: 11/838,067

(22) Filed: Aug. 13, 2007

(65) Prior Publication Data

US 2009/0048467 A1 Feb. 19, 2009

(51) Int. Cl.
*B01J 21/10* (2006.01)
*B01J 31/00* (2006.01)
*B01J 20/22* (2006.01)
*B01J 20/02* (2006.01)

(52) U.S. Cl. .................. 502/407; 502/150; 502/401; 502/406

(58) Field of Classification Search .................. 502/150, 502/401, 406, 407
See application file for complete search history.

(56) References Cited

U.S. PATENT DOCUMENTS

| | | | |
|---|---|---|---|
| 4,071,494 | A | 1/1978 | Gaylord |
| 4,409,365 | A | 10/1983 | Coran |
| 5,225,282 | A | 7/1993 | Chagnon |
| 5,624,711 | A | 4/1997 | Sundberg |
| 6,025,295 | A | 2/2000 | Tanielyan et al. |
| 6,544,923 | B1 | 4/2003 | Huang et al. |
| 6,689,820 | B2 | 2/2004 | Muranaka |
| 2005/0142296 | A1 | 6/2005 | Lakshmi |
| 2005/0283003 | A1 | 12/2005 | Spudich |
| 2006/0000758 | A1 | 1/2006 | Wormsbecher |
| 2007/0065490 | A1 | 3/2007 | Schaberg et al. |

OTHER PUBLICATIONS

Steiner et al. Tetrahedron: Asymmetry 15 (2004) 2307-2311.*
Bianchini et al. AdvSynthesis&Catalysis 2001:343(1):41-45.*
McNamara, Catherine A., Dixon, Mark J., and Bradley, Mark., Recoverable Catalysts and Reagents Using REcyclable Polystyrene-Based Supports, Chemical Review 2002, Oct. 9, 2002, v. 102, p. 3275-3300, American Chemical Society, Web edition.
Song, Choong Eui and Lee, Sang-gi., Supported Chiral Catalysts on Inorganic Materials, Chemical Review 2002, Aug. 27, 2002, p. 3495-3524, American Chemical Society, Web edition.
Clark, Thomas P. and Landis, Clark R., Recent developments in chiral phospholane chemistry, Tetrahedron: Asymmetry Report No. 67, Science Direct, Jun. 9, 2004, Elsevier.
Flach, H.N., Grassert, I., Oehme, G., Capka, M., New insoluble surfactant systems as aids in catalysis. A convenient method for nonbonded immobilization of catalytically active transition metal complexes., Colloid Polym Sci 274, Sep. 3, 1996, p. 261-268, Steinkopff Verlag.
Tang, Wenjun and Zhang, Xumu., New Chiral Phophorus Ligands for Enantioslective Hydrogenation, Chemical Review 2003, Jun. 6, 2003, p. 3029-3069, American Chemical Society, Web edition.
Blaser, Hans-Ulrich., Malan, Christophe., Pugin, Benoit., Spindler, Feliz., Steiner, Heinz., Studer, Martin., Selective Hydrogenation for Fine Chemicals: Recent Trends and New Developments, Adv Synth Catal. 2003, v. 345, p. 103-151, WILEY-VCH Verlag GmbH& Co., KGaA, Weinheim.
Bayston, Daniel J., Fraser, Joanne L., Ashton, Mark R., Baxter, Anthony D., Polywka, Mario E.C., and Moses, Edwin., Preparation and Use of a Polymer Supported BINAP Hydrogenation Catalyst, Journal Organic Chemistry 1998, v 63, p. 3137-3140., Apr. 7, 1998, American Chemical Society, Web edition.
Pini, Dario., Mandoli, Alessandro., Orlandi, Simonetta., and Salvadori, Piero, First example of a silica gel-supported optically active Mn(111)-salen complex as a heterogeneous asymmetric catalyst in the epoxidation of olefins, Tetrahedron: Asymmetry 10 (1999), p. 3883-3886, Pergamon.
Annis, D. Allen., Jacobsen, Eric N., Polymer-Supported Chiral Co(Salen) Complexes: Synthetic Applications and Mechanistic Investigations in teh Hydrolytic Kinetic Resolution of Terminal Epoxides, Journal of American Chemical Society 1999, Apr. 20, 1999, v. 121, p. 4147-4154, American Chemical Society, Web edition.
Fan, Quig-Hua., Li, Yue-Ming., Chan, Albert S. C., Recoverable Catalysts for Asymmetric Organic Synthesis, Chemical Review 2002, Sep. 18, 2002, p. 3385-3466, American Chemical Society, Web edition.

* cited by examiner

*Primary Examiner*—Jafar Parsa
(74) *Attorney, Agent, or Firm*—Workman Nydegger

(57) ABSTRACT

Organic ligands that contain at least one aryl group are immobilized on a solid support. The organic ligands are of the type used to form a catalyst complex suitable for carrying out a catalytic reaction, preferably an asymmetric reaction. To immobilize the organic ligands, a tethering group is bonded to the ligand using, for example, a Friedel-Crafts acylation or alkylation reaction. The immobilization of the organic ligand can be carried out using a single reaction with the organic ligand.

22 Claims, No Drawings

METHODS FOR MAKING IMMOBILIZED ARYL-CONTAINING LIGANDS

BACKGROUND OF THE INVENTION

1. The Field of the Invention

The present invention relates to methods for immobilizing aryl-containing organic ligands on a support material. The organic ligands are immobilized using a tethering agent that is bonded to the aryl group and to a support material.

2. The Relevant Technology

Catalysts are widely used in the manufacturing of organic compounds such as pharmaceuticals, agrochemicals, flavors, fragrances, and other functional materials. Catalysts can be generally divided into two main types, homogeneous and heterogeneous. Homogeneous catalysts are catalysts which are in the same phase as the reactants and/or products during the chemical reaction. Heterogeneous catalysts are catalysts that are not in the same phase as the reactants and/or products during the chemical reaction.

Homogeneous reactions are typically carried out in a liquid solution with a catalyst that is soluble in a liquid reaction medium. A catalyst dissolved in liquid phase reactants and products can be advantageous for achieving good selectivity and activity. In contrast, heterogeneous reactions are typically carried out in a liquid reaction medium, but the heterogeneous catalyst is typically in a solid phase. Heterogeneous catalysts can be separated from the liquid phase using separation techniques such as filtration or centrifugation.

Homogeneous catalysts are important in the pharmaceutical and fine chemicals industries where there is a growing need for catalysts that meet special selectivity requirements. Recently there has been an increased need for chiral selectivity to produce single enantiomer products. The need for single enantiomers is particularly important for pharmaceuticals where one enantiomer may have a beneficial pharmacological effect and another enantiomer of the same compound may have an undesirable side effect. Even when one enantiomer is not known to cause adverse affects, manufacturing a single enantiomer can be advantageous to simply avoid the expense of clinical trials on both enantiomers.

Historically, homogeneous catalysts, especially soluble organometallic complexes (metal-ligand complexes), have proven to be the most effective in achieving chiral selectivity. The challenge with using homogeneous catalysts is to remove the catalyst from the final product. Catalysts that are soluble in the same phase as the product can be difficult to separate from the product since the two species will be intimately mixed. Homogeneous catalysts that remain in the final product are often a source of contamination and reduce the quality of the final product. On the other hand, simply attaching a homogeneous catalyst to a support is not feasible, as it may de-activate the catalyst or interfere with the desired catalytic activity (e.g., by altering a desired conformation of the ligand as a result of a portion of the ligand being bound or attached to the solid support, and/or as a result of steric hindrance).

BRIEF SUMMARY OF THE INVENTION

The present invention is directed to methods for immobilizing an aryl-containing organic ligand to a support using an organic tethering agent. The methods of the invention are carried out so as to reduce or minimize the number of reaction steps needed to immobilize the organic ligand, thereby improving the yield of immobilized organic ligand. The tethering agent used to immobilize the organic ligand to the support material is a bifunctional or polyfunctional organic compound. The tethering agent includes a functional group near one end for bonding to the organic ligand (a "bonding functional group") and another functional group near another end for bonding the tethering agent to a support (an "anchoring functional group").

In one embodiment of the invention, the bonding functional group and the anchoring functional group are selected such that the reaction between the bonding functional group and the organic ligand can be carried out in the same reaction medium as the reaction between the anchoring functional group and the support. In a preferred embodiment, the two reactions are carried out simultaneously. Selecting a tethering agent that can be reacted with the support material and the organic ligand in the same reaction results in high yields of the immobilized organic ligands from a given amount of ligand as starting reagent.

In one embodiment, the tethering agent is bonded directly to the aryl group through a carbon-carbon coupling reaction. In a preferred embodiment, the bonding group is reacted with the aryl group of the organic ligand using a Freidel-Crafts acylation or alkylation reaction. The Freidel-Crafts acylation or alkylation reactions allow the ligand to be immobilized in a single step thereby giving high yields for the immobilization reaction. In addition, the carbon-carbon bond between the tethering group and the aryl group minimizes the effect that the tethering group has on the aryl group.

The type of bonding functional group on the tethering agent will depend on the particular organic ligand being immobilized. Examples of suitable bonding functional groups include hydroxyl groups, carboxyl groups, acyl halide groups, olefinic groups, and the like. In a preferred embodiment, the bonding functional group is an alkyl or acyl halide that can be directly bonded to the aryl group of the organic ligand. The bonding between the tethering agent and the ligand will be sufficiently strong to provide a useful degree of attachment, yet will not excessively modify the chemical environment of the organic ligand, thereby preserving the catalytic function and activity of a catalyst incorporating the ligand. Bonding the tethering agent to a ligand rather than the metal center has been found to minimize the effects that the tethering agent has on catalytic function.

In one embodiment the organic ligand is useful for forming an organometallic complex and/or is useful for making catalysts that are typically used as homogeneous catalysts. The present invention is particularly useful for immobilizing organometallic complexes that are useful for asymmetric syntheses, and exhibit high chiral selectivity. Immobilizing chiral catalyst according to the methods of the present invention can be advantageous because of the high cost of chiral catalysts and the difficulty of immobilizing chiral catalysts without significantly compromising catalytic activity. Because chiral catalysts are highly susceptible to steric hindrances, the tethering agents of the present invention can be used to immobilize chiral catalysts that would otherwise be rendered inactive using conventional immobilization techniques.

The anchoring functional group is selected to react with available functional groups on the surface of the support or functional groups available through an extender group that is bonded to the surface of the support. Examples of anchoring functional groups suitable for bonding to the support (i.e., the surface of the support or an extender bonded to the surface of the support) include hydroxyl, carboxyl, acid halide, nitrile, pyridine, amine, carbonyl, sulfate, $SO_3$, $PO_5$, alkyl chlorosulfite, and other reactive groups containing oxygen, nitrogen, sulfur, or phosphorus.

The solid support can be any support that has functional groups or can be modified to have functional groups for bonding the tethering agent and/or an extender group. Examples of suitable supports include solid oxides, inorganic carbons, polymers and resins, natural and synthetic zeolites, and natural minerals such as clays and the like. The solid support can be functionalized to have any functional group desired for reacting with the tethering agent. Examples of suitable functional groups include hydroxyl, carboxyl, acid halide, nitrile, pyridine, amine, carbonyl, sulfate, $SO_3$, $PO_5$, alkyl chlorosulfite, aromatic groups such as benzyl groups, and other reactive groups containing carbon, oxygen, nitrogen, sulfur, and/or phosphorus.

The extender is an organic molecule that can add chain length to the tethering agent to provide added separation between the support and the catalytic complex. The use of an extender is particularly advantageous to achieve long chain lengths while avoiding tethering agents with poor solubility. The extender can be any organic agent that can react on one end with the tethering agent and react with the support on another end. The extender can be reacted with the support and the tethering agent in any order or simultaneously. Examples of suitable extenders include those agents listed above with respect to tethering agents or other agents such as silanes.

The organic ligands are typically reacted with metals and/or other ligands to form a catalyst, including organometallic complexes. The ligands give the catalyst complexes certain catalytic properties, which are maintained in part by spacing the catalyst complex from the support surface. In a preferred embodiment, the tethering agent, and the optional extender agent, spaces the organic ligand from the support material by a main chain of at least 5 atoms, more preferably at least 8 atoms, even more preferably at least 10 atoms, and most preferably at least 12 atoms. For chain lengths greater than 10, the use of an extender may be advantageous to maintain solubility of the tethering agent. When the ligand is complexed to form a catalyst, the spacing between the ligand and the support material allows the immobilized catalyst to be accessible to molecules in a gas or liquid phase, thereby allowing reactants to reach the catalytic active sites of the complex. The spacing also minimizes the interference that the support might have with catalyst complexes.

The immobilization to the solid support allows the catalyst complexes employing the organic ligand to be recovered from the reaction product using techniques not available for separating a homogeneous catalyst. The immobilized ligands and/or catalyst complexes of the invention can be separated from the reaction product and residual reactants using any technique that will separate a solid support from a liquid including, but not limited to, filtration, centrifugation, and/or screening. These separation techniques allow the heterogeneous catalysts to achieve a long useful life in a continuous process or to be used in a batch process where the catalyst is recovered and recycled numerous times.

The immobilized catalyst complexes of the invention have a chemical structure and behavior that is substantially similar to the structure and behavior of the analogous non-immobilized complex in the homogeneous state. The immobilized catalyst complexes of the invention combine the advantages of homogeneous catalysts (high activity and selectivity, including chiral selectivity) with the advantages of heterogeneous catalysts (simple catalyst recovery and long catalyst life). The bonding to the support minimizes metal leaching during the catalytic organic reaction, even under varied conditions. In addition, the relatively long chain length separating the support from the catalyst complex ensures that the catalyst complex has freedom to move about in the solution, thereby avoiding changes to the electronic and steric environment around the active center and maintaining high activity and selectivity.

These and other advantages and features of the present invention will become more fully apparent from the following description and appended claims.

DETAILED DESCRIPTION OF EXAMPLE EMBODIMENTS

The present invention relates to immobilized organic ligands that contain at least one aryl group. The organic ligands can be used to form a catalyst complex suitable for carrying out a catalytic reaction, preferably an asymmetric reaction. To immobilize the organic ligands, a tethering group is bonded to the ligand using, for example, a Friedel-Crafts acylation or alkylation reaction. The tethering agent is also bonded to the support material either directly or through an extender agent. The tethering group is selected to minimize number of reaction steps needed to immobilize the organic ligand, while minimizing the effect that the tethering group and/or support has on catalytic activity. The following description describes the immobilization of an organic ligand that is part of an organometallic complex. Those skilled in the art will recognize that the invention can be carried out by simply immobilizing a ligand that is useful for forming a catalyst complex. Therefore, while the following description describes the invention in the context of a catalyst complex, the present invention includes organic ligands that are immobilized on a support material and that are useful for thereafter forming an immobilized catalyst complex.

I. Components Used to Make Immobilized Complexes

The catalysts of the invention are manufactured from a catalyst complex, a tethering agent, a support material, optionally one or more solvents, and optionally an extender.

A. Catalyst Complexes

The catalyst complexes include a plurality of organic ligands. At least one of the organic ligands includes an aryl group. Examples of suitable aryl groups include aryl, aryl-O, and/or aryl-N (without any electron withdrawing substituents such as—$NO_2$, —CN, —COOH etc). Examples of aryl groups suitable for bonding with the tethering agent include benzene, indene, naphthalene, fluorine, chrysene, phenanthrene, anthracene, triphenylene, and their aryl-O and aryl-N derivatives.

Preferably the aryl group of the organic ligand is unmodified from its structure as used in a homogenous catalyst, or in other words the aryl group is not functionalized. In this embodiment, the tethering agent is reacted directly with the aromatic ring using, for example, a Friedel-Crafts or Suzuki reaction. In a preferred embodiment, the reaction forms a carbon-carbon bond with the aryl group. In an alternative embodiment, the invention can be carried out on an organic ligand that has been functionalized so as to have a desired functional group that can then be reacted with the tethering agent. In this embodiment, the additional step to functionalize the aryl group is carried out to provide a functional group more suitable for carrying out a single step reaction with the tethering agent. The use of an organic ligand with a functionalized aryl group can be useful where the functionalization allows for a single step immobilization reaction of particularly high yields. Examples of suitable functionalization for the aryl group include hydroxyl groups, carboxyl groups, olefinic groups, and the like.

In one embodiment, one or more of the organic ligands includes phosphorus. Preferably the one or more organic ligands impart chirality to the catalyst complex such that the catalyst complex is useful for carrying out asymmetric reactions. Examples of suitable chiral phosphorous compounds include but are not limited to altropisomeric biaryl bisphosphine compounds, bisphosphane compounds, and their alkyl, alkyl-O, and alkyl-N substituted derivates (except derivatives substituted with electron withdrawing groups). Specific examples of suitable chiral phosphorous ligand systems include, but are not limited to the following:

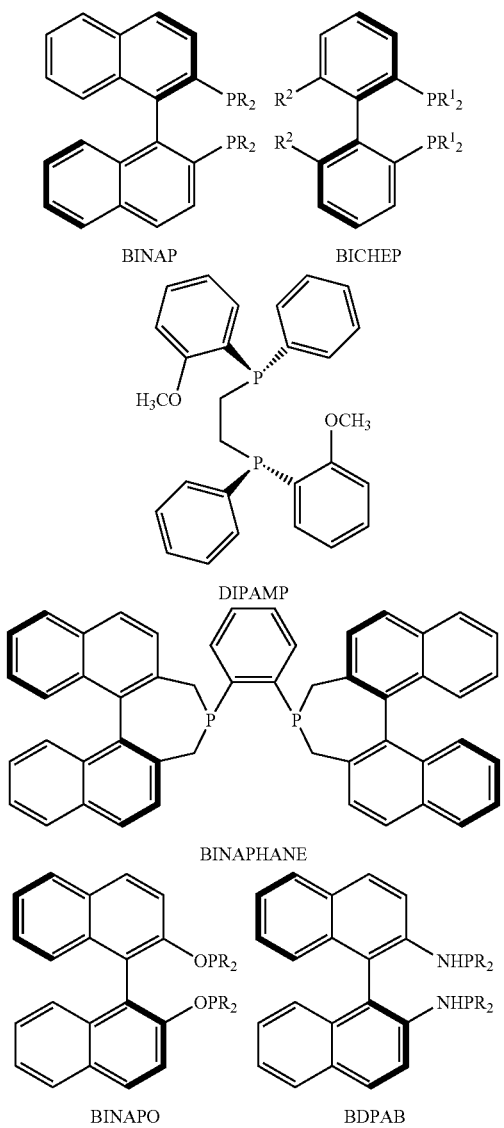

The catalyst complex optionally includes a metal center that provides the catalytic active center. The metal component can be any metal suitable for making an organometallic complex. Examples of suitable metals include the platinum group metals and base transition metals. Precious metals are preferred for many pharmaceutical catalysts and for asymmetric synthesis. If the organometallic complex is to be manufactured during the immobilization procedure (i.e., the organometallic complex is not provided as an already prepared complex), the metal is typically provided as a metal salt or other metal compound suitable for reacting the metal with the one or more ligands to make the catalyst complex.

Those skilled in the art are familiar with the various asymmetric reactions that can be carried out using organometallic complexes having one or more of the foregoing ligands. In one embodiment, the organic ligands and catalyst complexes can be of the type useful, at least in part, for carrying out asymmetric hydrogenation, asymmetric epoxidation, asymmetric dihydroxylation, asymmetric Diels-Alder reaction, or similar asymmetric reactions.

Examples of specific suitable catalyst complexes include Rh-DIPAMP, which can be used to manufacture $_L$-DOPA, an important drug used to treat Parkinson's disease. In another embodiment, ruthenium, rhodium, or palladium complexed with BINAP can be used for asymmetric hydrogenation to make novel olefins.

B. Tethering Agents and Extenders

The catalyst complexes are immobilized using a tethering agent. The tethering agent is a bifunctional or polyfunctional molecule capable of providing strong bonding between the aryl group of the organic ligand and the support. The tethering agent includes at least two functional groups, one of which can serve as a bonding functional for bonding the tethering agent to the organic ligand and the other which can serve as an anchoring functional group for bonding the tethering group to the support material (i.e., the support surface or an extender agent bonded to the support surface).

The bonding functional groups and the anchoring functional groups can be the same or different. In a preferred embodiment, the anchoring groups and the bonding groups are selected such that they can be reacted with the support and the ligand, respectively, under the same reaction conditions.

Examples of suitable anchoring functional groups and bonding functional groups include alkyl halide, acyl halide, hydroxyl, carboxyl, acid halide, nitrile, pyridine, amine, carbonyl, sulfate, $SO_3$, $PO_5$, alkyl chlorosulfite, and other reactive groups containing carbon, oxygen, nitrogen, sulfur, and/or phosphorus. In principle, the tethering agent may have any of these functional groups, singly or in combination, so long as each tethering agent molecule has at least one functional group that can bond with the organic ligand of the organometallic complex and another functional group that can be anchored to a solid support.

Examples of suitable tethering agents include, but are not limited to (i) acyl halides such as acyl chlorides containing additional active functional groups, including hydroxy acyl chlorides, such as compounds of the general formula $HO(CH_x)_nCOCl$, and carboxy acyl chlorides, such as compounds of the general formula $HOOC(CH_x)_nCOCl$, and diacyl chlorides, such as compounds of the general formula $ClOC(CH_x)_nCOCl$, or bromides of any of the forgoing; (ii) alkyl halides including, but are not limited to (i) acyl chlorides containing additional active functional groups, including hydroxy alkyl chlorides, such as compounds of the general formula $HO(CH_x)_nCCl$, and carboxy alkyl chlorides, such as compounds of the general formula $HOOC(CH_x)_nCCl$, and dialkyl chlorides, such as compounds of the general formula $ClOC(CH_x)_nCCl$, or bromides of any of the forgoing.

Optionally, an extender agent can be used to add additional chain length to the tethering agent. The extender molecules are selected to bond with the tethering agent and the support material. The extender agent can be any organic molecule that has functional groups capable of bonding to the support and to the tethering agent. Examples of suitable extender agents include (i) polyfunctional carboxylic acids, including diacids such as oxalic acid, malonic acid, succinic acid, glutaric acid, adipic acid, maleic acid, fumaric acid, phthalic acid, isophthalic acid, terephthalic acid, and the like; polyacids with functionality of three or greater, including citric acid and the like, as well as polymeric acids such as polyacrylic acid and the like; (ii) hydroxy acids such as glycolic acid, salicylic acid, hydroxy propanoic acid, and the like; (iii) acyl halides such as acyl chlorides containing additional active functional groups, including hydroxy acyl chlorides, such as compounds of the general formula $HO(CH_x)_nCOCl$, and carboxy acyl chlorides, such as compounds of the general formula $HOOC(CH_x)_nCOCl$, and diacyl chlorides, such as compounds of the general formula $ClOC(CH_x)_nCOCl$; (iv) nitriles, particularly those that contain both one or more nitrile groups along with at least one other group such as hydroxyl, carboxyl, or acyl chloride, including hydroxyacetonitrile, 3-hydroxyproprionitrile, 2-hydroxyisobutyronitrile, carboxyacetonitrile, and the like; and (v) pyridines, such as those that contain both one or more pyridine groups along with at least one other group such as hydroxyl, carboxyl, or acyl chloride, including 2-hydroxymethylpyridine, picolinic acid (2-pyridine carboxylic acid), nicotinic acid (3-pyridine carboxylic acid), and/or quinolinic acid (2,3-pyridine dicarboxylic acid). The functional groups on the tethering agent and the extender agent are selected so as to ensure that the extender agent bonds to the support and the tethering agent bonds to the extender so as to form a desired chain length separating the organometallic complex from the support.

C. Solid Support

A variety of solid support materials may be used for the present invention, including various solid oxides (alumina, silica, zirconia, titania, ceria, and the like), inorganic carbons (carbon black, activated carbon, graphite, and the like), polymers and resins, natural and synthetic zeolites, and natural minerals such as clays and the like. The solid supports have surface functionalities that can be used as anchoring sites for the tethering agents and/or extender agents of the present invention. Example functionalities include hydroxyl, sulfonate, amine, and aromatic groups such as benzyl groups. The solid support can be provided in a variety of physical forms, including powder, pellets, spheres, extrudates, or the like. One suitable support is a reverse phase silica with aromatic functionalities on its surface.

D. Solvents

The immobilized catalyst complexes of the invention are typically manufactured using a solvent. Any solvent can be used so long as it is suitable for the particular reaction performed to make the catalyst. For example, when carrying out the Freidel-Crafts reaction, the solvent is typically nitrobenzene. In the case where a solid support is functionalized with an extender agent, other solvents can be used, including toluene, water, alcohols such as methanol and ethanol, and a variety of other common organic solvents, and their mixtures. The preferred choice of solvent will depend on several factors, such as the solubility of the starting materials. Where more hydrophilic solvents are desired, the immobilized catalyst can be manufactured using an extender such that longer chain lengths can be achieved while using agents with higher solubility in common solvents.

II. Methods for Manufacturing Immobilized Catalysts

The present invention also provides methods for producing immobilized organic ligands and immobilized catalyst complexes. The immobilized organic ligands and catalyst complexes are manufactured by first selecting a particular organic ligand or catalyst complex to be immobilized and then selecting the proper components to immobilize the ligand or complex. The particular tethering agent, solvents, solid support, and optionally extender agents are selected according to the solubility of the ligand or complex, the solubility of the tethering agent and/or the extender agent, the available functional groups on the surface of the solid support, and the yields that the reactions will produce.

The immobilized organic ligands and/or catalyst complexes can be manufactured using several different synthesis routs. In one embodiment, the method includes (i) providing an organic ligand comprising at least one aryl group or a functionalized aryl group; (ii) providing a support material having a plurality of available functional groups; (iii) providing a tethering agent having an anchoring functional group capable of bonding with the support material and a bonding functional group that is capable of bonding to the aryl group or the functionalized aryl group, wherein the anchoring functional group is selected so as to be capable of reacting with the support material in the same reaction medium as a reaction medium used to react the bonding functional group with the aryl group or the functionalized aryl group; and (iv) in a single reaction medium, (1) reacting the bonding group of the tethering agent with the aryl group or functionalized aryl group and (2) reacting the bonding group of the tethering agent with the support material, so as to yield an aryl-containing organic ligand immobilized on the support material.

In an alternative embodiment, the method includes the steps of (i) providing an organic ligand that includes at least one aryl group, (ii) reacting the tethering agent with the organic ligand using a Freidel Crafts acylation or alkylation reaction or other reaction suitable for forming a carbon-carbon bond with the aryl group, and (iii) reacting the tethering agent with the support material.

The reaction between the tethering agent and the organic ligand can be carried out by mixing the tethering agent and the ligand or complex in an appropriate solvent under conditions that allow or cause the tethering agent to with the aryl group of the organic ligand and form a carbon-carbon bond. The tethering agent and organic ligand can be reacted using catalysts, mixing, heating, refluxing, reducing agents, and/or other suitable techniques. In a preferred embodiment, the tethering agent includes an alkyl halide group or an acyl halide group and the organic ligand includes an aryl group that is available for bonding with the alkyl halide or acyl halide through a Freidel-Crafts alkylation or Freidel-Crafts-acylation reaction. Examples of suitable aryl groups that can be a component of the organic ligand and bonded to the tethering agent through an alkylation reaction or an acylation reaction include, but are not limited to, indene, naphthalene, fluorine, chrysene, phenanthrene, anthracene, chrysene, and triphenylene. In one embodiment, the organometallic complex includes at least two aryl groups that are bonded together and the tethering agent is bonded to one of the two conjoined aryl groups. The acylation reaction and the alkylation reaction can be carried out using conditions and catalysts known to those skilled in the art.

The reaction involved in bonding the tethering agent to the support or the extender agent will depend on the particular functional groups available on the support or the extender agent. Generally, the tethering agent and the support are mixed together in a solvent under conditions suitable to the anchoring functional group of the tethering agent to bond with available functional groups on the surface of the support, or optionally an available functional group on the extender agent. For example, in one embodiment, the tethering agent can include a silane that is bonded to hydroxyl groups on the surface of an oxide material (e.g., silica or alumina). Similarly, the anchoring functional group of the tethering agent can be reacted with functional groups on the extender agent to form a strong bond (e.g., and ester or amide linkage).

In general, the solid support, extender agent, tethering agent, organic ligand, and any other components of the immobilized catalyst complexes can be reacted in any order to form the proper linkages between components and/or to manufacture the organometallic complex, so long as the reactions for each step are compatible with the components present in the reaction mixture. In a preferred embodiment, the reaction order is selected so as to minimize the number of reactions that involve the organic ligand and/or so as to maximize the yield of immobilized organic ligand for a given amount of ligand used as a starting reagent. For example, in one embodiment, the tethering agent can be reacted with the support prior to being reacted with the organic ligand. The tethering agent can also be reacted with the organic ligand prior to or after the organic ligand is bonded to the metal to form an organometallic complex. Similarly, the extender, is preferably reacted with the support before or simultaneously with being reacted with the tethering agent.

In a preferred embodiment, the organic ligand is immobilized to the support material in a single step reaction. The single step reaction can be accomplished by selecting a tethering agent that can react with the aryl group and with the support or an extender group on the support in a single reaction. In one embodiment, the tethering agent is a diacyl halide that is reacted with the aryl group of the tethering agent and the support/extender in a single step reaction. For example, the support material can have aromatic functional groups on its surface such that the diacyl halide reacts with the aromatic group on the support and the aryl group of the organic ligand in a single reaction.

Another example of a single step reaction includes an inorganic support material that is treated with an amino silane extender group. The silane group reacts with the inorganic support (e.g., silica) and the amine is then available for the single step reaction with a diacyl halide and the organic ligand. Acylation or alkylation with a diacyl or dialkyl halide can be carried out in a single reaction with one alkyl halide or acyl halide reacting with the amine group and the other alkyl halide or acyl halide reacting with the aryl group of the organic ligand. While this embodiment includes more than one reaction step, the organic ligand is only involved in one of the reaction steps to accomplish immobilization.

Immobilizing the organic ligand in a single step reaction can be advantageous because it minimizes the loss of expensive ligand due to reaction yields. Although a single reaction step involving the organic ligand is preferred, the invention can also be carried out using the organic ligand in more than one step so long as the yields of the multiple steps are relatively high.

The immobilized ligands are typically used to form a catalytic complex. The catalytic complex can include a catalytic metal or a plurality of additional ligands that form a complex. The catalytic complex is typically manufactured using known techniques. The organic ligand can be converted into the desired catalyst complex by reaction with appropriate ligands at one of several points. For example, the an organometallic complex may be formed prior to the formation of the tethering agent-organic ligand bond, such that a metal-ligand complex exists prior to reacting the ligand with the tethering agent molecules. Alternately, the various ligands can be reacted with a metal or other organic ligands after the tethering agent has been bonded to one of the ligands, such that the catalyst complex is formed in situ in the reaction mixture.

At the completion of any of the abovementioned methods, a dried immobilized organic ligand and/or catalyst complex is obtained. Once dried, the immobilized catalyst can be used as is. However, it may be preferred in some cases to subject the material to further treatment to obtain the final immobilized catalyst. For example, various heat treatments can be used in various combinations, including any sequence or combination of heating the material in inert, oxidizing, or reducing atmospheres. This treatment may cure or set the anchoring bond between the tethering agent and the solid support, or may encourage some required chemical or structural modification of the material.

III. Immobilized Ligands

The immobilized organic ligands of the present invention are aryl containing ligands that are bonded to a tethering group through a carbon-carbon bond and immobilized on a solid support material. The tethering group provides spacing between the organic ligand and the solid support. The separation between the organic ligand and the support material minimizes the adverse effects that the support can have on the activity of the catalyst complex employing the organic ligand. In addition, bonding the tethering group to the ligand minimizes the chances that the tethering agent will adversely affect the electrical properties of the active center of the catalyst complex.

The length of the main chain between the support and the aryl group is selected to provide a desired amount of spacing. In one embodiment, the tethering group, and optionally an extender group, together provide a main chain of at least 5 atoms. In a preferred embodiment, the main chain is at least 8 atoms long, more preferably at least 10 atoms long, and most preferably at least 12 atoms long.

For purposes of this invention, the main chain of atoms are atoms that are linked in a linear chain between the surface of the support and the ligand of the organometallic complex. The main chain can be a straight chain of atoms or can form a portion of a cyclical compound. The main chain can include heteroatoms, single bonds, double bonds, branching, and the like. In a preferred embodiment, the atoms of the main chain are bonded through single bonds so as to give the main chain the greatest degree of freedom.

In one embodiment of the invention, the immobilized catalyst complexes of the invention have the following general structure:

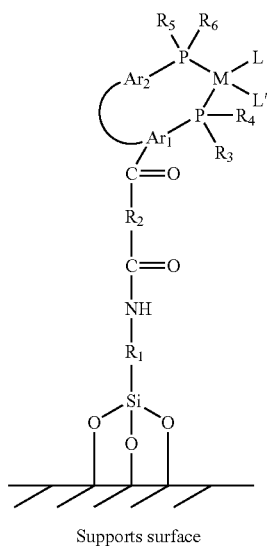

Supports surface

In the foregoing structure, M is metal atom; $Ar_1$ and $Ar_2$ are independently an aryl group, an aryl-O group, or an aryl-N group, with the proviso that the group does not have an electron withdrawing substituent; $R_2$-$R_6$ are independently an alkyl group or an aryl group; and $L_1$ and $L_2$ are independently a halogen, an amine, or an amide.

In a preferred embodiment, $R_1$ and $R_2$ are an alkyl chain having 1-18 carbon atoms and/or $Ar_1$ and $Ar_2$ are selected from the following group of aryl compounds or their aryl-O or aryl-N derivatives:

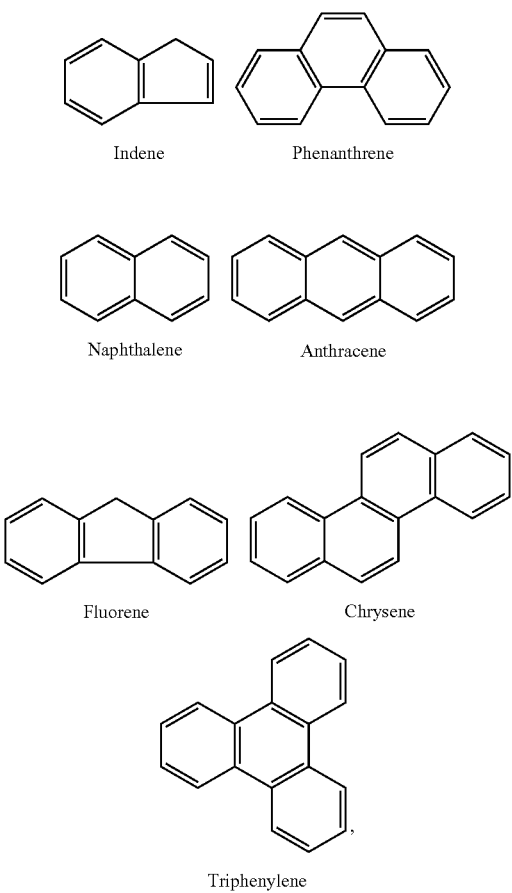

In one embodiment, $R_3$-$R_6$ are an altropisomeric biaryl bisphosphine compound or a bisphosphane compound such as, but not limited to, chiral BINAP, BICHEP, DIPAMP, BINAPHANE, BINAPO, BDPAB and their alkyl, alkyl-O, alkyl-N substituted derivates (with the proviso that the substituents do not include electron withdrawing groups). Examples of suitable compounds include the following:

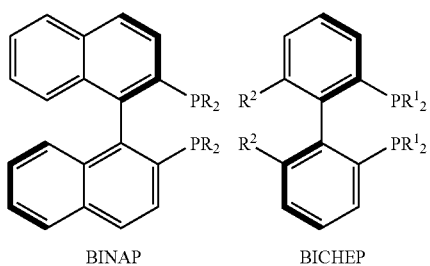

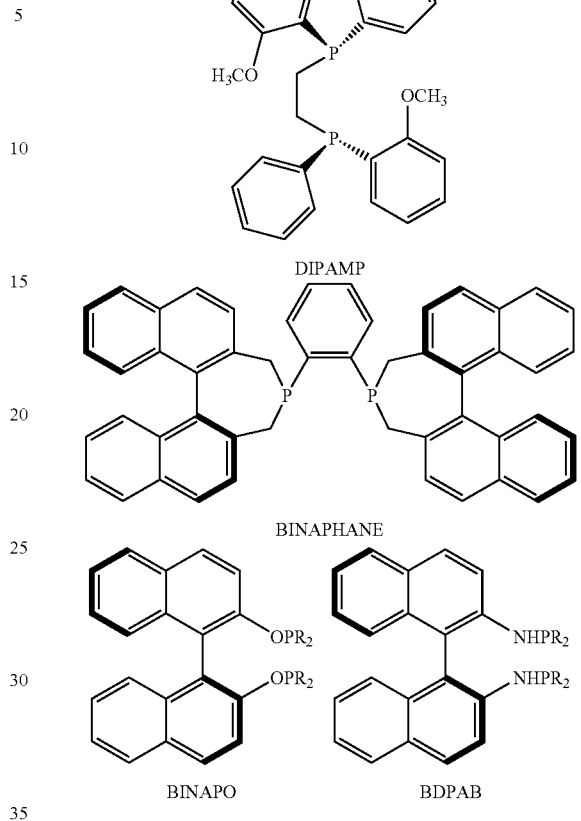

IV. Methods of Use

The immobilized organic ligands or catalyst complexes of this invention are useful for a wide variety of chemical reactions, including hydrogenation, oxidation, dehydrogenation, coupling, and other reactions. These catalysts are particularly advantageous for conducting reactions that would normally require purely homogeneous catalysts, such as highly selective reactions for the production of valuable fine chemicals and pharmaceutical ingredients, including asymmetric reactions that require chiral selectivity to produce single enantiomer products.

The immobilized catalyst complexes are typically used in reactions where the catalyst is in a solid phase and the reactants are in a liquid phase. Because the immobilized catalyst complexes are in a solid phase and the reaction medium is in a liquid phase, it can be very easy to remove the heterogeneous catalyst from the reaction product. In one embodiment, the catalysts are used to catalyze a reaction (e.g., hydrogenation, oxidation, dehydrogenation, or coupling) and then the catalyst is separated from the reaction mixture using filtration, centrifugation, screening, or a similar technique.

These separation techniques take advantage of the phase difference between the immobilized catalyst and the reaction mixture, thereby avoiding contamination problems. The methods are particularly useful for pharma applications where contamination has negative effects for end users (i.e., patients). The efficient separation techniques of the invention can also reduce some of the costs associated with the more difficult separation techniques used to remove homogeneous catalysts from reaction products. Many of the separation techniques of the invention make it possible to reuse the catalyst in a subsequent reaction. Recycling catalyst can provide an economic advantage since many of the catalysts of the invention include precious metals and/or organic ligands that are expensive to dispose of.

V. EXAMPLES

The following examples provide formulas for making and using immobilized organometallic complexes according to certain embodiment of the invention.

Example 1

Preparation of Immobilized Catalyst Complex

Example 1 provides a method for preparing an immobilized catalyst on an inorganic oxide support. First, an extender agent was bonded to the surface of $SiO_2$. 5.38 g of (3-aminopropyl) trimethoxysilane was added to a suspension of 20 g $SiO_2$ in 100 ml toluene. The suspension was refluxed for 12 hr under Ar atmosphere. After filtration, the solid was washed by 20 ml toluene for three times and then dried. 10 g of the extender modified $SiO_2$ solid was added to a solution of 2.52 g adipoyl chloride in 50 ml toluene. The suspension was heated to reflux with stirring for 12 hr and then followed by filtration and dryness. The extender and tethering agent modified $SiO_2$ was ready to use for immobilizing s-BINAP.

Next, s-BINAP was immobilized on the tether-modified $SiO_2$. 10 g of the tether-modified $SiO_2$ was stirred in 40 ml solution of 1.0 M $AlCl_3$ in nitrobenzene under Ar atmosphere. 0.45 g s-BINAP in 10 ml nitrobenzene was added using a syringe. This suspension was heated to 120° C. for 12 hr. Thereafter the solid was filtered out and washed 3 times by fresh nitrobenzene and then 2 times by toluene to yield an immobilized ligand intermediate.

Finally, the catalyst complex was prepared using the immobilized s-BINAP ligand. To prepare immobilized Ru(s-BINAP)$Cl_2$ catalyst, 10 g of the ligand immobilized ligand intermediate was added to 50 ml toluene. Thereafter, 0.248 g dichloro(1.5-cyclooctadiene)ruthenium(II) polymer was added. The suspension was heated to reflux for 12 hr under Ar atmosphere. After cooling down, the solid was filtered out and washed several times using DMF until wash was colorless. The immobilized Ru (s-BINAP)$Cl_2$ was ready to use after drying in a vacuum.

Example 2

Preparation of Immobilized Catalyst Complex

Example 2 describes the preparation of Ru(s-BINAP)$Cl_2$ using a similar procedure as in Example 1 except that organometallic complex is formed prior to reacting the tethering agent with the BINAP ligand. 10 g of the tether-modified $SiO_2$ from Example 1 and 0.6 g of Ru(s-BINAP)$Cl_2$ were added to 50 ml solution of 1.0M $AlCl_3$ in nitrobenzene. The suspension was heated to reflux for 12 hr under Ar atmosphere. After cooling down, the solid was filtered out and washed several times by DMF and toluene until the wash was colorless. The immobilized Ru(s-BINAP)$Cl_2$ was ready to use after drying in a vacuum.

Example 3

Preparation of Immobilized Catalyst Complex

Example 3 describes the preparation of Ru(PPh$_3$)$_3$Cl$_2$ immobilized on alumina. 10 g of $Al_2O_3$ (gamma, basic surface) and 4.0 g of polyacrylic acid were added to 30 ml benzene. Then a few drops of trifluoroacetic acid were added. The mixture was heated to 80° C. for 3-4 hr. After filtration, the solid was washed by EtOH and water and then added to the solution of 1.08 g NaOH in 50 ml $H_2O$ and dried. The surface-modified $Al_2O_3$ support was ready for catalyst immobilization.

10 g of surface-modified $Al_2O_3$ was added to 40 ml toluene. The solution of 0.417 g Ru(PPh$_3$)$_3$Cl$_2$ in 10 ml toluene was added through a cannula. The suspension was stirred under $N_2$ atmosphere for 12 hr. After that the color in the solvent disappeared the $Al_2O_3$ particles turned yellow. After filtration, washing with toluene and drying, the immobilized Ru(PPh$_3$)$_3$Cl$_2$ was available for use. The content of Ru, 0.41 wt %, was determined by atomic absorption spectrum.

Example 4

Preparation of Immobilized Catalyst Complex

Example 4 describes a method for preparing Rh(PPh$_3$)$_3$Cl on alumina. the method of Example 4 was carried identical to the method of Example 3, except that Rh(PPh$_3$)$_3$Cl was used instead of Ru(PPh$_3$)$_3$Cl$_2$.

Example 5

Preparation of Immobilized Catalyst Complex

Example 5 describes a method of making Ru(s-BINAP)Cl$_2$ immobilized on alumina. 5 g of the surface-modified $Al_2O_3$ available from the procedure in Example 3, 0.1 g Ru(s-BINAP)Cl$_2$, and 1.0 equiv s-BINAP were added to 40 ml methanol under argon atmosphere. The suspension was stirred at room temperature until the methanol solution turned colorless. After filtration, washing with methanol, and drying, the immobilized Ru(s-BINAP)Cl$_2$ chiral catalyst was ready for use.

Example 6

Preparation of Immobilized Catalyst Complex

Example 6 describes a method for preparing Ru(s-BINAP)Cl$_2$ on alumina. 10 g of $Al_2O_3$ (gamma, basic surface) and 0.3 g of 6-amino-1-hexanol were added to 30 ml THF. Then a few drops of trifluoroacetic acid were added. The mixture was heated to 80° C. for 8 hr. After filtration, the solid was washed with EtOH and water and then added to the solution of 1.08 g NaOH in 50 ml $H_2O$. The mixture was stirred for 2 hr at room temperature, followed by filtration, washing by acetone, and drying. The surface-modified $Al_2O_3$ support was ready for catalyst immobilization.

5 g of the surface-modified $Al_2O_3$ was added to 40 ml methanol. A solution of 0.1 g Ru(s-BINAP)Cl$_2$ and 1.0 equiv. s-BINAP in 10 ml methanol were added through a cannula. The suspension was stirred under argon atmosphere for 12 hr. After filtration, washing with methanol, and drying, the immobilized Ru(s-BINAP)Cl$_2$ was ready for use.

Example 7

Asymmetric Hydrogenation of Methyl Acetoacetate

Example 7 describes a method for asymmetrically hydrogenating methyl acetoacetate to form S-(+)-methl-3-hydroxyl-buterate. 4.0 g $SiO_2$ immobilized Ru (s-BINAP)Cl$_2$ catalyst manufactured using the method of Example 1 and 3.32 g methyl acetoacetate were placed in 300 ml stainless steel autoclave equipped with a mechanically stirring blade, a pressure gauge, and a gas inlet tube attached to a hydrogen source. Air present in the autoclave was replaced by nitrogen. 100 ml methanol was added to the autoclave under a stream of nitrogen. The mixture was degassed by three vacuum-filling with nitrogen cycles. Thereafter, the autoclave was charged with about 30 psi nitrogen and then heated to 100° C. When the temperature stabilized, the vessel was pressurized to 1060 psi with hydrogen. The reaction mixture was vigorously stirred for 2 hr at 100° C. The conversion of methyl acetoacetate to S-(+)-methl-3-hydroxyl-buterate was determined by HPLC (column, AGP 150×40 mm; eluent, 10:90 2-propanol-$H_2O$ with PH 5.9; temp, 27.8° C.; flow rate, 0.3 ml/min. The $t_R$ of S-(+)-methyl-3-hydroxyl-butyrate was 5.40 min (84.23%), the tR of R-isomer, 4.71 min. (<0.5%), and the tR of methyl acetoacetate was 4.76 min. (15.77%). The conversion was 84.23% with >99% enantiomeric excess.

Example 8

Asymmetric Hydrogenation of Methyl Acetoacetate

Example 8 describes a method for asymmetrically hydrogenating methyl acetoacetate to form S-(+)-methl-3-hydroxyl-buterate using a recycled catalyst. Catalyst used in the method of Example 7 was obtained by filtration and used in a second run according to the method of Example 7. The conversion determined by HPLC was 96.45% with >99% enantiomeric excess.

Example 9

Asymmetric Hydrogenation of Methyl Acetoacetate

Example 9 describes a method for asymmetrically hydrogenating methyl acetoacetate to form S-(+)-methl-3-hydroxyl-buterate. The procedure was carried out similar to the procedure describe in Example 7 except that the immobilized catalyst of Example 2 was used rather than the catalyst from Example 1. The reaction was carried out for 4 hr using 4.0 g of the immobilized Ru(s-BINAP)$Cl_2$ catalyst from Example 2. The conversion determined by HPLC was 83.39% with >99% enantiomeric excess.

Example 10

Asymmetric Hydrogenation of Methyl Acetoacetate

Example 10 describes a method for asymmetrically hydrogenating methyl acetoacetate to form S-(+)-methl-3-hydroxyl-buterate using a recycled catalyst. Catalyst used in the method of Example 9 was obtained by filtration and used in a second run, and then in a subsequent third run, and subsequent fourth run. All were subsequent runs were performed by filtering the catalyst from the prior reaction and reusing the catalyst according to the method of Example 9, except that the reaction time was 6 hr. The product was analyzed by HPLC and determined to be 95.86% conversion and 99% ee for the second run, 95.98% conversion and 99% ee for the third run, and 95.59% conversion and 99% ee for the forth run.

As shown in the foregoing examples, high conversion and high selectivity can be achieved in reactions using the immobilized catalyst of the present invention. The immobilized catalysts are readily recoverable for use in subsequent reactions. Surprisingly, recycled catalyst even showed improved conversion compared to freshly prepared immobilized catalyst.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for immobilizing an aryl-containing organic ligand, comprising:
combining together the following in a single reaction medium:
an organic ligand comprising at least one aryl group or functionalized aryl group;
a functionalized support material having a plurality of available functional groups; and
a tethering agent having an anchoring functional group selected so as to bond with the functionalized support material and a bonding functional group that is selected so as to bond with the aryl group or functionalized aryl group,
wherein the anchoring functional group is selected so as to react with the functionalized support material in the same reaction medium as a reaction medium used to react the bonding functional group with the aryl group or functionalized aryl group of the organic ligand; and
in the single reaction medium, (i) reacting the bonding functional group of the tethering agent with the aryl group or functionalized aryl group of the organic ligand and (ii) reacting the anchoring functional group of the tethering agent with an available functional group of the support material, so as to yield an aryl-containing organic ligand immobilized on the support material wherein the bonding functional group of the tethering agent is an alkyl halide or an acyl halide and the reaction of the bonding functional group is a Freidel-Crafts alkylation reaction or a Freidel-crafts acylation reaction.

2. A method as in claim 1, wherein the bonding functional group and the anchoring functional group are a dialkyl halide or a diacyl halide.

3. A method as in claim 1, where the bonding functional group of the tethering agent reacts with the aromatic ring of the aryl group.

4. A method as in claim 1, wherein the reaction of the bonding functional group and the reaction of the anchoring functional group occur simultaneously.

5. A method as in claim 1, wherein the organic ligand is a ligand that can be used to manufacture a chiral catalyst.

6. A method as in claim 1, wherein the tethering agent is selected from the group consisting of polyfunctional carboxylic acids, polyacids with functionality of three or greater, polymeric acids, hydroxy acids, alkyl halides, acyl halides, nitriles, pyridines and derivatives thereof.

7. A method as in claim 1, wherein the tethering agent is selected from the group consisting of oxalic acid, malonic acid, succinic acid, glutaric acid, adipic acid, maleic acid, fumaric acid, phthalic acid, isophthalic acid, terephthalic acid, citric acid polyacrylic acid, glycolic acid, salicylic acid, hydroxy propanoic acid, compounds of the general formula HO($CH_x$)$_n$COCl, compounds of the general formula HOOC($CH_x$)$_n$COCl, compounds of the general formula ClOC($CH_x$)$_n$COCl, hydroxyacetonitrile, 3-hydroxyproprionitrile, 2-hydroxyisobutyronitrile, carboxyacetonitrile, 2-hydroxymethylpyridine, picolinic acid (2-pyridine carboxylic acid), nicotinic acid (3-pyridine carboxylic acid), quinolinic acid (2,3-pyridine dicarboxylic acid), and combinations thereof.

8. A method as in claim 1, wherein the aryl group is selected from the group consisting of benzene, indene, naphthalene, fluorine, chrysene, phenanthrene, anthracene, triphenylene, and aryl-O and aryl-N derivatives thereof, with the proviso that the groups do not include electron withdrawing substituents.

9. A method as in claim 1, wherein the organic ligand is selected from the group consisting of BINAP, BICHEP, DIPAMP, BINAPHANE, BINAPO, BDPAB, and alkyl, alkyl-O, or alkyl-N derivatives thereof, with the proviso that the derivatives do not have electron withdrawing group substituents.

10. A method as in claim 1, wherein the support material further comprises extender groups and the available functional groups of the support material are provided by the extender groups.

11. A method as in claim 1, after the tethering agent is bonded to the organic ligand the method further comprising complexing the organic ligand with a metal atom.

12. A method as in claim 1, further comprising complexing the organic ligand with a metal atom prior to bonding the organic ligand to the tethering agent.

13. A method as in claim 1, wherein the tethering agent provides a separation of at least 3 atoms between the support material and the organic ligand.

14. A method as in claim 1, wherein the tethering agent provides a separation of at least 8 atoms between the support material and the organic ligand.

15. A method as in claim 1, wherein the support material is selected from the group consisting of alumina, silica, zirconia, titania, ceria, natural and synthetic zeolites, clay, reverse phase silica, and combinations thereof.

16. A method as in claim 1, wherein the support material is selected from the group consisting carbon black, activated carbon, graphite, polymers, resins.

17. A method for immobilizing an aryl-containing organic ligand, comprising:
providing an organic ligand comprising at least one aryl group;
providing a functionalized support material having a plurality of available functional groups;
providing a tethering agent comprising a plurality of molecules, each having (i) a bonding functional group comprising a leaving group, and (ii) an anchoring functional group selected so as to bond with the functionalized support material wherein the bonding functional group of the tethering agent is alkyl halide or an alkyl halide;
reacting the tethering agent with the organic ligand in a Freidel-Crafts alkylation reaction or a Freidel-Crafts-acylation reaction so as to form a carbon-carbon bond between the tethering agent and the aryl group of the organic ligand; and
reacting the anchoring functional group of the tethering agent with an available functional groups of the functionalized support material.

18. A method as in claim 17, wherein the anchoring functional group is an acyl halide or an alkyl halide.

19. A method as in claim 17, wherein the support material further comprises extender groups and the extender groups provide the available functional groups.

20. A method as in claim 17, wherein the available functional groups of the support material comprise an amine or an aromatic group.

21. A method as in claim 17, wherein the reactions of the tethering agent with the support material and the tethering agent with the organic ligand are carried out in a single reaction step.

22. A method as in claim 17, wherein the reaction of the tethering group to the support material occurs in a subsequent reaction to the reaction of the bonding group to the aryl group.

* * * * *